United States Patent
Yamada et al.

(10) Patent No.: US 10,906,460 B2
(45) Date of Patent: Feb. 2, 2021

(54) SKIN MATERIAL FOR VEHICLE INTERIOR

(71) Applicants: TOYOTA BOSHOKU KABUSHIKI KAISHA, Aichi-ken (JP); DAIKI CO., LTD., Fukui-ken (JP)

(72) Inventors: Takamasa Yamada, Aichi-ken (JP); Atsuhiko Ito, Aichi-ken (JP); Takayoshi Yamamoto, Fukui-ken (JP); Hirohiko Sakai, Kyoto-fu (JP); Kousei Egawa, Aichi-ken (JP)

(73) Assignees: TOYOTA BOSHOKU KABUSHIKI KAISHA, Aichi-Ken (JP); DAIKI CO., LTD., Fukui-Ken (JP)

( * ) Notice: Subject to any disclaimer, the term of this patent is extended or adjusted under 35 U.S.C. 154(b) by 67 days.

(21) Appl. No.: 15/827,597

(22) Filed: Nov. 30, 2017

(65) Prior Publication Data

US 2018/0162268 A1    Jun. 14, 2018

(30) Foreign Application Priority Data

Dec. 13, 2016  (JP) .................................. 2016-241508

(51) Int. Cl.
*B60Q 3/62*       (2017.01)
*D03D 15/00*      (2006.01)
(Continued)

(52) U.S. Cl.
CPC ............. *B60Q 3/62* (2017.02); *B60Q 3/217* (2017.02); *B60Q 3/54* (2017.02); *B60R 13/02* (2013.01);
(Continued)

(58) Field of Classification Search
USPC ....................................................... 442/181
See application file for complete search history.

(56) References Cited

U.S. PATENT DOCUMENTS 4,541,885 A * 9/1985 Caudill, Jr. ......... B29C 66/1122
                                              156/220
5,280,991 A * 1/1994 Weiland ............. B60R 13/0206
                                              160/DIG. 16
(Continued)

FOREIGN PATENT DOCUMENTS

DE         10110329       * 9/2002
EP          2267204       * 12/2010
(Continued)

OTHER PUBLICATIONS

Machine translation of JPS60215838, Yokota et al. (Year: 1985).*
(Continued)

*Primary Examiner* — Shawn Mckinnon
(74) *Attorney, Agent, or Firm* — Greenblum & Bernstein, P.L.C.

(57) ABSTRACT

There is provided a skin material for vehicle interior, which is woven from a side emission type optical fiber and a synthetic resin fiber, forms a design surface in a vehicle compartment and functions as an illumination. The skin material for vehicle interior is a skin material 10 for vehicle interior including a woven fabric woven by using a synthetic resin fiber and a side emission type optical fiber as warp or weft, wherein the ratio $(d_S/d_f)$ of the fineness $(d_S)$ of the synthetic resin fiber to the fineness $(d_f)$ of the side emission type optical fiber ranges from 1.5 to 7.0. When the synthetic resin fiber is a multifilament 11, the ratio $(d_{S1}/d_f)$ of the fineness $(d_{S1})$ thereof to the fineness $(d_f)$ of the side emission type optical fiber 3 ranges from 2.0 to 7.0. Also, when the synthetic resin fiber is a monofilament, the ratio $(d_{S2}/d_f)$ of the fineness $(d_{S2})$ thereof to the fineness $(d_f)$ of the side emission type optical fiber ranges from 1.5 to 6.0.

8 Claims, 4 Drawing Sheets

(51) Int. Cl.
  *B60R 13/02* (2006.01)
  *F21V 8/00* (2006.01)
  *B60Q 3/217* (2017.01)
  *B60Q 3/54* (2017.01)
(52) U.S. Cl.
  CPC ......... *B60R 13/0243* (2013.01); *D03D 15/00* (2013.01); *D03D 15/0011* (2013.01); *G02B 6/001* (2013.01); *B60Q 2500/10* (2013.01); *B60R 2013/0287* (2013.01); *D03D 2700/0174* (2013.01); *D10B 2101/06* (2013.01); *D10B 2401/20* (2013.01); *D10B 2505/12* (2013.01); *F21V 2200/15* (2015.01)

(56) References Cited

U.S. PATENT DOCUMENTS

2010/0053990 A1* 3/2010 Brochier ................ G02B 6/001
  362/556
2014/0211498 A1* 7/2014 Cannon ................... B60Q 3/54
  362/555

FOREIGN PATENT DOCUMENTS

| JP | S60215838 | * | 10/1985 |
| JP | S61-201001 U | | 12/1986 |
| JP | 2009-084738 A | | 4/2009 |
| JP | 2010-267573 A | | 11/2010 |
| JP | 2016037688 | * | 3/2016 |
| WO | WO2016059225 | * | 4/2016 |

OTHER PUBLICATIONS

Johnson et al., Pizzuto's Fabric Science: Studio Access Card, pp. 67 (Year: 2015).*
Machine translation of JP2016037688; Sasaki et al. (Year: 2016).*
Machine translation of JP2010267573; Wakita et al. (Year: 2010).*
Machine translation of EP2267204, Pintz (Year: 2010).*
Machine translation of DE10110329 (Year: 2002).*
Japanese Office Action issued in Japan Counterpart Patent Appl. No. 2016-241508, dated Aug. 4, 2020 (and English-translation thereof).

* cited by examiner

SKIN MATERIAL FOR VEHICLE INTERIOR

CROSS-REFERENCE TO RELATED APPLICATIONS

The present application claims priority under 35 U.S.C. § 119 of Japanese Application No. 2016-241508 filed on Dec. 13, 2016, the disclosure of which is expressly incorporated by reference herein in its entirety.

BACKGROUND

1. Technical Field

The present invention relates to a skin material for vehicle interior, which is woven from a multifilament or monofilament which is a synthetic resin fiber and a side emission type optical fiber, forms a design surface in a vehicle compartment and functions as an illumination.

2. Related Art

Along with popularization of the Internet and the like, the use of optical fibers is expanding in technical fields of optical communication and the like. Based on the property of optical fibers that they can guide light made incident from one end to the other end for light transmission, the optical fibers are used also in applications including, for example, various illuminations and displays.

For example, there is known an optical fiber woven fabric including an optical fiber woven fabric woven from optical fibers and normal yarns as warps or wefts and a light source delivering light to at least one end of the respective optical fibers, the optical fiber woven fabric functioning as an illumination device that allows for entrance of light from the light source into the optical fibers, and thus can be utilized as automobile interior parts such as door trims and small parts (see, for example, JP 2010-267573 A). This literature explains that uneven light emission of the optical fiber woven fabric can be reduced by regularly weaving the optical fibers and the normal yarns in this optical fiber woven fabric to control the woven texture and emission luminance to be in predetermined states.

SUMMARY

In the optical fiber woven fabric described in JP 2010-267573 A, uneven light emission can possibly be reduced by controlling the woven texture and emission luminance to be in predetermined states. JP 2010-267573 A, however, nowhere mentions preventing the optical fibers from excessively appearing on the surfaces of the automobile interior parts to cause wear and damage of the optical fibers or defining the finenesses of the optical fibers and normal yarns within proper ranges for that purpose.

Conventionally, the skin material for vehicle interior is produced by weaving multifilaments that are synthetic resin fibers as warps and wefts. In this case, multifilaments having relatively low fineness of, for example, about 167 dtex are frequently used from the viewpoint of the wear resistance and strength as well as the appearance. Further, when optical fibers are used as warps or wefts, easy-to-weave side emission type optical fibers made of a resin are preferably used as the optical fibers. Those having fineness of 607 dtex and a diameter of about 0.25 mm can be used as the side emission type optical fibers.

When the multifilaments and side emission type optical fibers as mentioned above are used for weaving, for example, a skin material 10 for vehicle interior as shown in FIG. 4 can be produced. This skin material 10 for vehicle interior includes a woven texture in which a multifilament 12 having small fineness is woven on each side of three side emission type optical fibers 3, and both of the side emission type optical fibers 3 and the multifilaments 12 are joined to a substrate 4 for vehicle interior made of a resin. In this form, however, many of the side emission type optical fibers 3 appear on the outermost surface of the skin material, which is disadvantageous in terms of wear and damage.

Then, the woven texture can also be designed in such a manner that multifilaments 12 having small fineness appear on the outermost surface as shown in FIG. 5. In this case, however, the multifilaments 12 having small fineness can be reduced in diameter or cut due to wear. Further, when the skin material is pressed, it is conceivable that the multifilaments 12 having small fineness are pushed inward as shown in FIG. 6, so that the side emission type optical fibers 3 may appear on the outermost surface of the skin material, and thus may be worn or damaged.

Further, when there are used multifilaments 13 whose fineness is larger than that of the multifilaments shown in FIGS. 4 to 6 but smaller than that of the large-fineness multifilaments 11 shown in FIG. 1, i.e., whose fineness is not large enough as shown in FIG. 7, in the case where the multifilaments 13 have worn out, the side emission type optical fibers 3 appear on the outermost surface of the skin material, so that the wear and damage of the side emission type optical fibers 3 may not be suppressed sufficiently. On the other hand, when multifilaments 14 having excessively large fineness are used as shown in FIG. 8, the appearance as a skin material can be changed, and, when the multifilaments are pressed to be deformed, the appearance can be impaired due to light shielding.

The present invention has been made in light of the circumstances of the above-mentioned conventional techniques, and an object thereof is to provide a skin material for vehicle interior, which is woven from a multifilament or monofilament that is a synthetic resin fiber and a side emission type optical fiber, forms a design surface in a vehicle compartment and functions as an illumination, and prevents or, at least, suppresses the wear and damage of the optical fiber.

The present invention is defined as follows.

1. A skin material for vehicle interior, which is joined to a substrate for vehicle interior made of a resin,
the skin material for vehicle interior including a woven fabric woven by using a synthetic resin fiber and a side emission type optical fiber as warp or weft,
wherein the ratio $(d_S/d_f)$ of the fineness $(d_S)$ of the synthetic resin fiber to the fineness $(d_f)$ of the side emission type optical fiber ranges from 1.5 to 7.0.

2. The skin material for vehicle interior according to the above item 1, wherein the synthetic resin fiber is a multifilament, and the ratio $(d_{S1}/d_f)$ of the fineness $(d_{S1})$ of the multifilament to the fineness $(d_f)$ of the side emission type optical fiber ranges from 2.0 to 7.0.

3. The skin material for vehicle interior according to the above item 2, wherein the 2 to 5 side emission type optical fibers are woven between the adjacent multifilaments.

4. The skin material for vehicle interior according to the above item 1, wherein the synthetic resin fiber is a monofilament.

5. The skin material for vehicle interior according to the above item 4, wherein the ratio $(d_{S2}/d_f)$ of the fineness $(d_{S2})$ of the monofilament to the fineness ($d_f$) of the side emission type optical fiber ranges from 1.5 to 6.0.

6. The skin material for vehicle interior according to the above item 4, wherein the 1 to 3 side emission type optical fiber(s) is/are woven between the adjacent monofilaments.

7. The skin material for vehicle interior according to the above item 5, wherein the 1 to 3 side emission type optical fiber(s) is/are woven between the adjacent monofilaments.

The skin material for vehicle interior according to the present invention is woven by using a synthetic resin fiber and a side emission type optical fiber as warp or weft, and has a ratio ($d_S/d_f$) of the fineness ($d_S$) of the synthetic resin fiber to the fineness ($d_f$) of the side emission type optical fiber ranging from 1.5 to 7.0.

By using a synthetic resin fiber having fineness within such a proper range, the side emission type optical fiber is positioned inward from the synthetic resin fiber, and thus does not appear on the outermost surface of the skin material, thereby preventing or, at least, suppressing the wear and damage of the side emission type optical fiber caused by contact with passengers and other articles. Also, the appearance of the skin material would not be impaired due to excessively large fineness of the synthetic resin fiber, nor would the design of the skin material be impaired due to the shield of light emitted from the side emission type optical fiber.

Additionally, when the synthetic resin fiber is a multifilament and the ratio ($d_{S1}/d_f$) of the fineness ($d_{S1}$) of the multifilament to the fineness ($d_f$) of the side emission type optical fiber ranges from 2.0 to 7.0, the fineness of the multifilament would not become excessively small, and the wear and damage of the side emission type optical fiber would be sufficiently suppressed even if the multifilament is worn.

Further, when the ratio ($d_{S1}/d_f$) falls within the above-mentioned range and the 2 to 5 side emission type optical fibers are woven between the adjacent multifilaments, a skin material with good appearance can be produced without impairing the design due to the light emission from the optical fiber.

Also, when the synthetic resin fiber is a monofilament, it is difficult to wear and damage. So, the wear and damage of the optical fiber would be sufficiently suppressed even though its fineness is smaller than that of the multifilament.

Further, when the ratio ($d_{S2}/d_f$) of the fineness ($d_{S2}$) of the monofilament to the fineness ($d_f$) of the side emission type optical fiber ranges from 1.5 to 6.0, the wear and damage of the side emission type optical fiber can be sufficiently suppressed even if its fineness is made smaller than that of the multifilament.

Also, when the ratio ($d_{S2}/d_f$) falls within the above-mentioned range and the 1 to 3 side emission type optical fiber(s) is/are woven between the adjacent monofilaments, the luminance can be sufficiently ensured by utilizing the gloss of the monofilaments to reflect light from the optical fibers, even if the number of the optical fibers is decreased.

DETAILED DESCRIPTION

Figure 1:
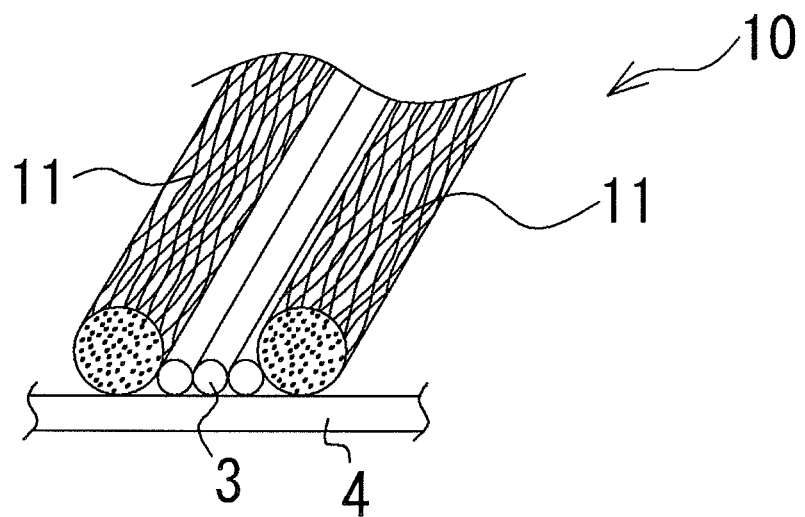
FIG. 1 is a schematic explanatory view showing a difference in fineness between multifilaments and optical fibers of a skin material for vehicle interior according to the present invention when the multifilaments are used as synthetic resin fibers.

Hereinafter, the present invention will be described in detail with reference to the drawings.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, and the description is taken with the drawings making apparent to those skilled in the art how the forms of the present invention may be embodied in practice.

A skin material 10 for vehicle interior according to the present invention is joined to a substrate 4 for vehicle interior made of a resin. Also, the skin material 10 includes a woven fabric woven by using a synthetic resin fiber and a side emission type optical fiber 3 as warp or weft (see FIG. 1 in which multifilaments 11 are used as synthetic resin fibers, and FIGS. 2 and 3 in which monofilaments 2 are used as the synthetic resin fibers). The skin material 10 is characterized in that the ratio ($d_S/d_f$) of the fineness ($d_S$) of the synthetic resin fiber to the fineness ($d_f$) of the side emission type optical fiber 3 ranges from 1.5 to 7.0.

The skin material 10 for vehicle interior is woven by using the synthetic resin fibers and the side emission type optical fibers 3 as warps or wefts. Whether the synthetic resin fibers and the side emission type optical fibers 3 are woven as warps or wefts is not particularly limited, and can be set as appropriate, for example, depending on the types of the woven texture and loom used. The loom used for weaving the skin material 10 for vehicle interior is not particularly limited, and examples thereof include a rapier loom (Models "G6500, R9500" manufactured by Itema Weaving Ltd. (Italy)), a jacquard loom (Models "CX880, DX110, LX1602, SXB" manufactured by STÄUBLI (France)) and a dobby loom (Model "UVIVAL500" manufactured by STÄUBLI (France)).

The ratio ($d_S/d_f$) of the fineness ($d_S$) of the synthetic resin fibers to the fineness ($d_f$) of the side emission type optical fibers 3 have only to be 1.5 to 7.0, but it is preferred to set the ratio ($d_S/d_f$) within a more proper range depending on whether the synthetic resin fibers are the multifilaments 11 or monofilaments 2. More specifically, when the synthetic resin fibers are the multifilaments 11, the ratio ($d_S/d_f$) is preferably defined within a larger numerical range falling within the above-mentioned numerical range. When the synthetic resin fibers are the monofilaments 2, on the other hand, the ratio ($d_S/d_f$) is preferably defined within a smaller numerical range falling within the above-mentioned numerical range.

For example, when the multifilaments 11 are used as the synthetic resin fibers as shown in FIG. 1, the ratio ($d_S/d_f$) of the fineness ($d_{S1}$) of the multifilaments 11 to the fineness ($d_f$) of the side emission type optical fibers 3 is preferably 2.0 to 7.0, more preferably 3.0 to 7.0, especially preferably 4.5 to 7.0. When the synthetic resin fibers are the multifilaments 11 in this manner, they are susceptible to be worn upon contact with passengers and other articles and to be deformed by pressing, as compared with when the synthetic resin fibers are the monofilaments 2. So, fibers having relatively large fineness within a proper fineness range are preferably used.

Further, the fineness of the multifilaments 11 is not particularly limited, but is preferably 1000 to 4000 dtex, especially 2000 to 4000 dtex, further 2500 to 4000 dtex in order to prevent the side emission type optical fibers 3 from appearing on the outermost surface, on the inside of the vehicle compartment, of the skin material 10 for vehicle interior to be worn and damaged.

Figure 2:
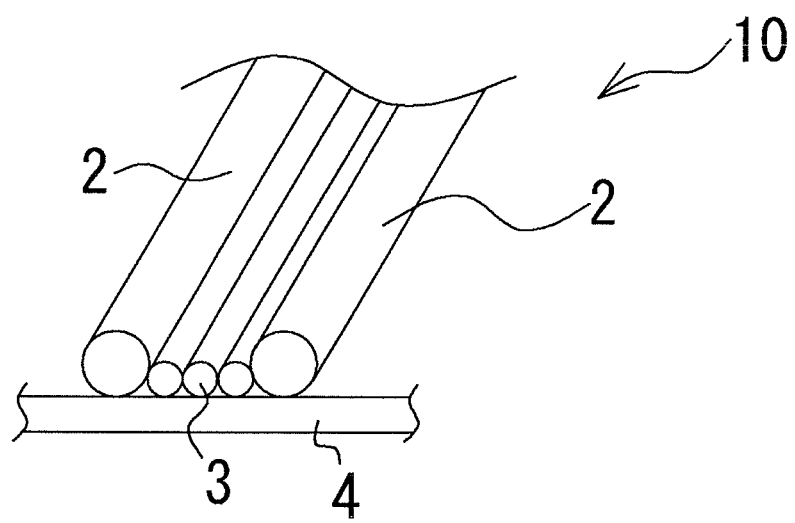
FIG. 2 is a schematic explanatory view showing a difference in fineness between monofilaments and optical fibers of a skin material for vehicle interior according to the present invention when the monofilaments are used as the synthetic resin fibers.
Figure 3:
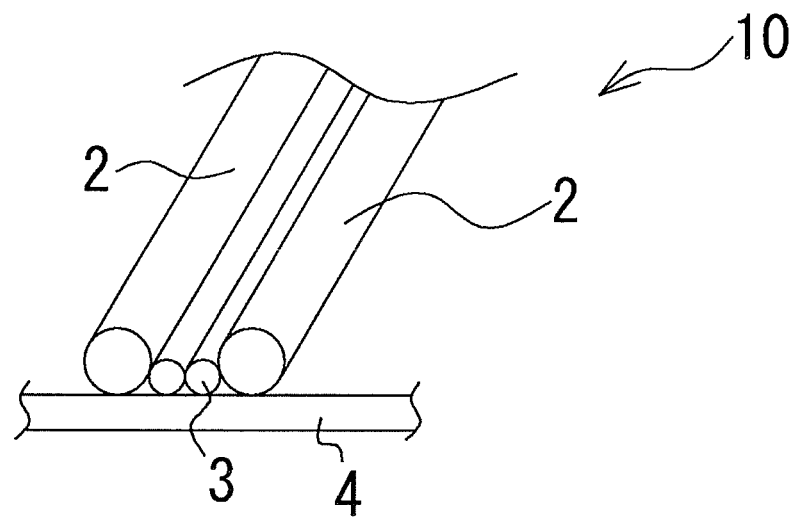
FIG. 3 is a schematic explanatory view of the skin material for vehicle interior when the number of optical fibers is decreased in FIG. 2.
Figure 4:
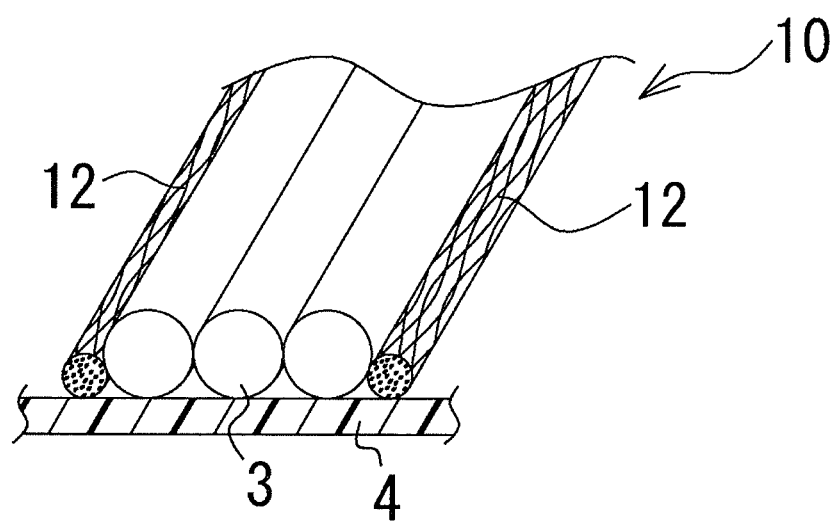
FIG. 4 is a schematic explanatory view of a skin material for vehicle interior including multifilaments with excessively small fineness and optical fibers which appear on the outermost surface.
Figure 5:
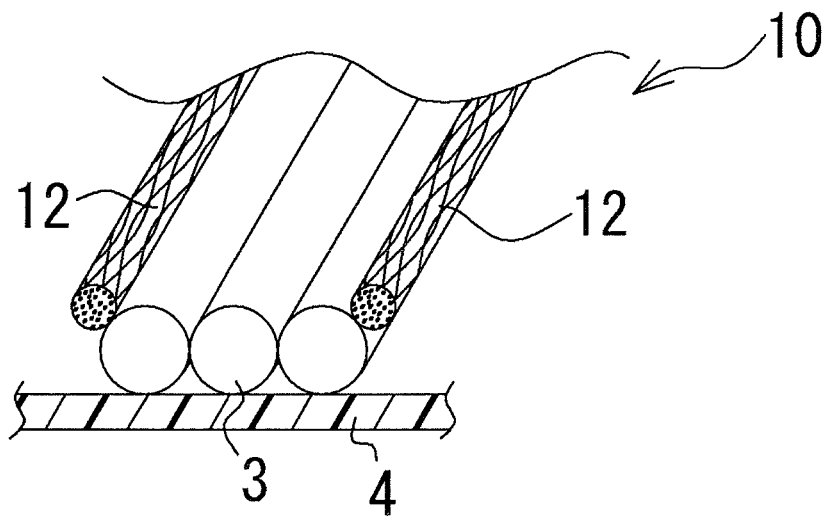
FIG. 5 is a schematic explanatory view of a skin material for vehicle interior including multifilaments with excessively small fineness and woven in such a manner that the optical fibers do not appear on the outermost surface.
Figure 6:
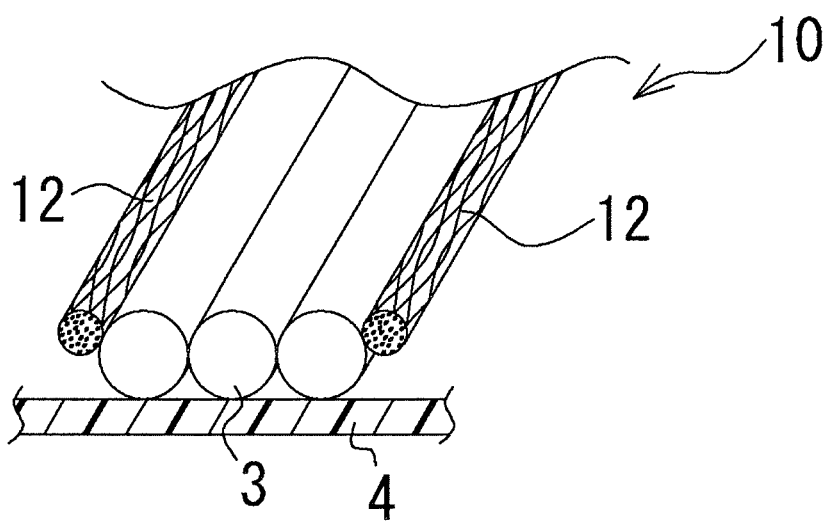
FIG. 6 is a schematic explanatory view of the skin material for vehicle interior in which the multifilaments in FIG. 5 are worn and/or pressed so that the optical fibers appear on the outermost surface together with the multifilaments.
Figure 7:
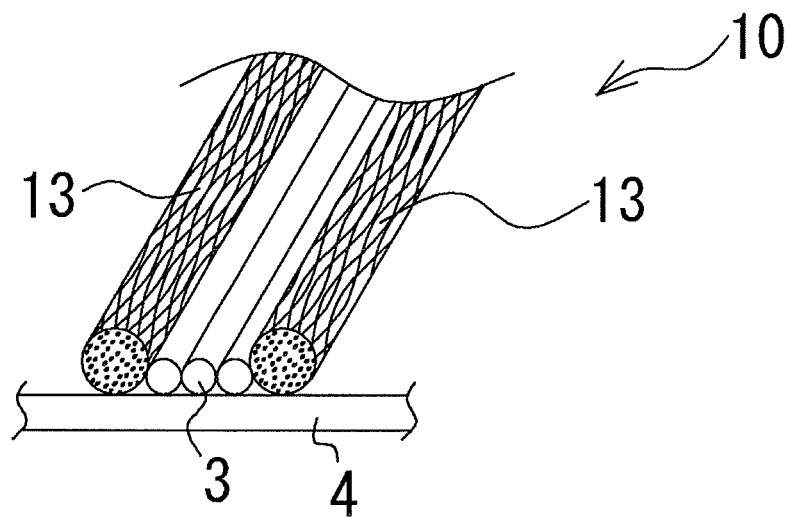
FIG. 7 is a schematic explanatory view of a skin material for vehicle interior including multifilaments having fineness which is larger than that of the multifilaments shown in FIGS. 4 to 6, but insufficient.
Figure 8:
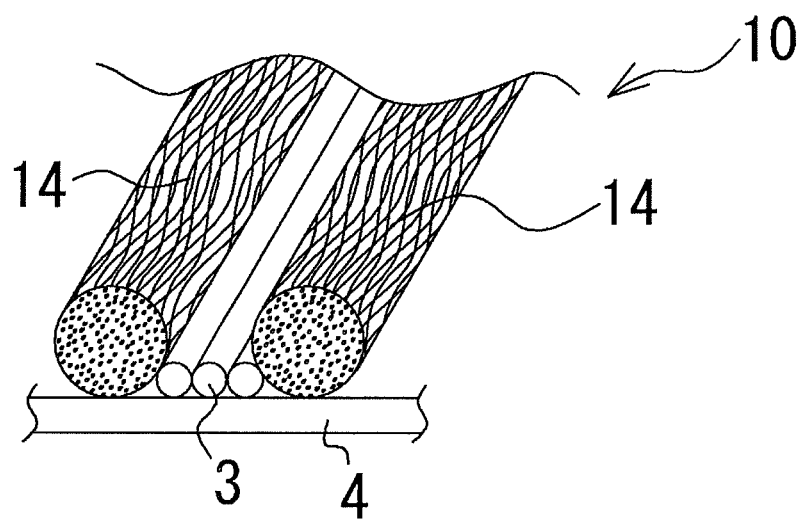
FIG. 8 is a schematic explanatory view of a skin material for vehicle interior when the fineness of the multifilaments is excessively large.

On the other hand, when the monofilaments 2 are used as the synthetic resin fibers as shown in FIGS. 2 and 3, the ratio ($d_{S2}/d_f$) of the fineness ($d_{S2}$) of the monofilaments 2 to the fineness ($d_f$) of the side emission type optical fibers 3 preferably ranges from 1.5 to 6.0, more preferably ranges from 1.5 to 4.0, especially preferably 1.5 to 3.5. When the synthetic resin fibers are the monofilaments 2 in this manner, they are hard to be worn upon contact with passengers and other articles and to be deformed by pressing, as compared with when the synthetic resin fibers are the multifilaments 11. So, fibers having relatively small fineness within a proper fineness range are preferably used.

Further, the fineness of the monofilaments 2 is not particularly limited, but is preferably 1000 to 3500 dtex, especially 1000 to 3000 dtex, further 1000 to 2000 dtex in order to prevent the side emission type optical fibers 3 from appearing on the outermost surface, on the inside of the vehicle compartment, of the skin material 10 for vehicle interior to be worn and damaged.

The side emission type optical fibers 3 can take a form such that they do not appear on the outermost surface of the skin material 10 for vehicle interior and are woven at a deep position on a more inner side, for example, based on the woven texture, such as double-woven texture or triple-woven texture, of the woven fabric woven by using the side emission type optical fibers 3 and the multifilaments 11 or monofilaments 2 and also by controlling the yarn density.

Further, the appearing of the side emission type optical fibers 3 on the outermost surface, on the inside of the vehicle compartment, of the skin material 10 for vehicle interior can be prevented by adjusting the finenesses of the multifilaments 11 and monofilaments 2 and the side emission type optical fibers 3 so as to attain the fineness ratio as mentioned above. Hence, when the side emission type optical fibers 3 having small fineness are used, the fiber diameter of the multifilaments 11 would not be smaller than that of the side emission type optical fibers 3 even if the diameter of the multifilaments 11 is decreased by the tension applied during weaving, so that the side emission type optical fibers 3 can be suppressed from appearing on the outermost surface, on the inside of the vehicle compartment, of the skin material 10. Also, the appearing of the side emission type optical fibers 3 on the outermost surface of the skin material 10 can be prevented more effectively by considering the woven texture and yarn density as well as the functions and effects of small and large finenesses, respectively.

The number of the side emission type optical fibers 3 to be continuously woven between the synthetic resin fibers is not particularly limited, but can be defined as 1 to 5, from the viewpoint of the design of the skin material 10 for vehicle interior as an interior material, the form thereof as a woven fabric, the strength, etc. Further, when the synthetic resin fibers are the multifilaments 11 (see FIG. 1), the number of the side emission type optical fibers 3 to be woven continuously can be defined as 2 to 5, preferably as 3 to 4.

When the synthetic resin fibers are the monofilaments 2 (see FIGS. 2 and 3), on the other hand, it is possible to utilize the gloss thereof to reflect light from the optical fibers, thereby ensuring sufficient luminance. Therefore, the number of the side emission type optical fibers 3 to be woven continuously can be decreased as compared with when the synthetic resin fibers are the multifilaments 11. The number of the side emission type optical fibers 3 can be defined specifically as 1 to 3, preferably as 2 to 3. Also, when the synthetic resin fibers are the monofilaments 2, a skin material 10 for vehicle interior with excellent design and good appearance can be produced, for example, even when two side emission type optical fibers 3 are used as shown in FIG. 3.

Synthetic resin fibers are used as the multifilaments 11 and monofilaments 2. The material for the synthetic resin fibers is not particularly limited, and fibers made of various synthetic resins can be used. Examples of this synthetic resin include: polyamide-based resins such as nylon 6 and nylon 66; polyester-based resins such as polyethylene terephthalate, polybutylene terephthalate and polytrimethylene terephthalate; polyacrylic resins; and polyolefin-based resins such as polypropylene. As the synthetic resin, a polyamide-based resin and a polyester-based resin are especially preferred.

Optical fibers are normally composed of a core layer and a clad layer, and have a structure such that the outer periphery of the core layer is covered by the clad layer. Due to the materials for the core layer and clad layer, respectively, and their refractive indexes and reflectances, the side emission type optical fibers 3 can be configured to appropriately leak and emit light from the side surfaces. Further, the core layer and the clad layer may each be either a single layer or a laminate of a plurality of layers. Examples of the optical fibers include various optical fibers such as optical fibers made of a resin and quartz-based optical fibers. The optical fibers used in the present invention are woven in the woven fabric, and thus are side emission type optical fibers 3 made of a resin, which are flexible, have excellent bending impact and the like and can be easily woven.

While the side emission type optical fibers 3 such as the existing optical fibers made of a resin have a diameter of about 0.1 to 10 mm, side emission type optical fibers 3 having a diameter of 0.15 to 1.5 mm, especially of 0.15 to 1.0 mm, further of 0.15 to 0.4 mm are preferably used from the viewpoint of easiness to weave, reduction of uneven light emission or general-purpose properties. While the fineness of the side emission type optical fiber 3 made of a resin varies depending on the types of the resins which constitute the core layer and clad layer, respectively, examples thereof include 607 dtex when the diameter is 0.25 mm as mentioned above. A preferred fineness range of the side emission type optical fiber 3 is defined based on a preferred fineness ratio with respect to the finenesses of the multifilaments 11 and monofilaments 2, respectively.

As the core layer of the optical fibers made of a resin, there are preferably used resins having excellent transparency: for example, acrylic resins such as polymethyl methacrylate, polyethyl methacrylate and polyethyl acrylate; polycarbonate resins; polystyrene resins; and polyolefin-based resins. Further, as the clad layer, there are preferably used resins having excellent transparency and a refractive index smaller than that of the core layer: for example, vinylidene fluoride resins, vinylidene fluoride-tetrafluoroethylene copolymer resins, polychlorotrifluoroethylene resins and trifluoroisopropyl methacrylate resins.

Further, in order to allow the side emission type optical fibers 3 woven in the skin material 10 for vehicle interior to emit light, the tip end parts of a plurality of side emission type optical fibers 3 are bundled together, and a light source is arranged at a position facing their end surfaces. The light source is not especially limited, but LED is normally used. Light is delivered and guided from the LED light source toward the end surfaces of the side emission type optical fibers 3 bundled together, so that the side emission type optical fibers 3 emit light. Also, when the tip end parts of the plurality of side emission type optical fibers 3 are bundled together, all the side emission type optical fibers 3 woven in the skin material 10 for vehicle interior may be bundled together, if possible, depending on the shape and dimensions (area) of the skin material 10 for vehicle interior. Alternatively, a plurality of side emission type optical fiber bundles in which a predetermined number of the side emission type optical fibers 3 are bundled together may be employed.

Also, the substrate 4 for vehicle interior is normally a molded body made of a synthetic resin, and molded into a shape of a vehicle interior material such as a door trim or a roof trim by a press-molding method involving heating and pressurization by means of a molding die. Also, the synthetic resin is not especially limited, and polyolefin resins such as polyethylene and polypropylene and polyamide resins such as nylon 6 and nylon 66 are used. Among these synthetic resins, polypropylene is preferred from the viewpoint of easiness to mold, strength and the like. Also, a fiber reinforced resin including glass fiber, carbon fiber or the like can be used in order to improve the physical properties such as rigidity.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention can be utilized in the technical field of skin materials for vehicle interior, which are joined to a substrate for vehicle interior and can be utilized as indirect illuminations in vehicle compartments. Especially, the present invention is useful in the technical field of skin materials for vehicle interior materials such as a door trim and a roof trim.

What is claimed is:

1. A skin material for vehicle interior, which is joined to a substrate for vehicle interior made of a resin,
   the skin material for vehicle interior comprising a woven fabric woven by using a synthetic resin fiber and a side emission optical fiber as warp or weft,
   wherein the side emission optical fiber is woven between the adjacent synthetic resin fibers,
   wherein the side emission optical fiber is positioned inward from the synthetic resin fiber,
   wherein the side emission optical fiber and the synthetic resin fiber are arranged side by side,
   wherein the ratio ($d_S/d_f$) of the fineness ($d_S$) of the synthetic resin fiber to the fineness ($d_f$) of the side emission optical fiber ranges from 5.0 to 7.0,
   wherein the synthetic resin fiber is a multifilament,
   wherein two to five side emission optical fibers are woven between the adjacent multifilaments, and
   wherein each of the synthetic resin fibers and each of the two to five side emission optical fibers are arranged to contact with the substrate such that each of the two to five side emission optical fibers are arranged at a same height relative to the substrate in a cross section view of the side emission optical fibers.

2. A skin material for vehicle interior, which is joined to a substrate for vehicle interior made of a resin,
   the skin material for vehicle interior comprising a woven fabric woven by using a synthetic resin fiber and a side emission optical fiber as warp or weft,
   wherein the side emission optical fiber is woven between the adjacent synthetic resin fibers,
   wherein the side emission optical fiber is positioned inward from the synthetic resin fiber,
   wherein the side emission optical fiber and the synthetic resin fiber are arranged side by side,
   wherein the ratio ($d_S/d_f$) of the fineness ($d_S$) of the synthetic resin fiber to the fineness ($d_f$) of the side emission optical fiber ranges from 5.0 to 7.0,
   wherein the synthetic resin fiber is a monofilament, and
   wherein two to three side emission optical fibers are woven between the adjacent monofilaments, and
   wherein each of the synthetic resin fibers and each of the two to three side emission optical fibers are arranged to contact with the substrate such that each of the two to three side emission optical fibers are arranged at a same height relative to the substrate in a cross section view of the side emission optical fibers.

3. The skin material for vehicle interior according to claim 1, wherein the side emission optical fiber is made of a resin.

4. The skin material for vehicle interior according to claim 1, wherein the side emission optical fiber have a diameter of 0.15 mm to 1.5 mm.

5. The skin material for vehicle interior according to claim 3, wherein the side emission optical fiber have a diameter of 0.15 mm to 1.5 mm.

6. The skin material for vehicle interior according to claim 2, wherein the side emission optical fiber is made of a resin.

7. The skin material for vehicle interior according to claim 2, wherein the side emission optical fiber have a diameter of 0.15 mm to 1.5 mm.

8. The skin material for vehicle interior according to claim 6, wherein the side emission optical fiber have a diameter of 0.15 mm to 1.5 mm.

\* \* \* \* \*